Figure 1:
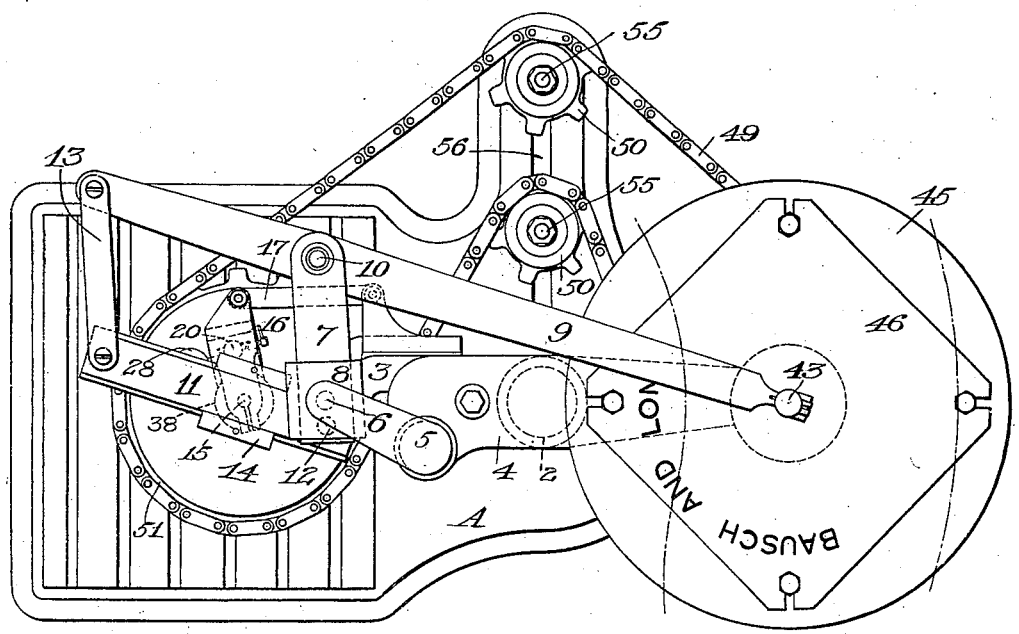

No. 873,008. PATENTED DEC. 10, 1907.
E. BAUSCH.
ENGRAVING MACHINE.
APPLICATION FILED JUNE 13, 1907.

2 SHEETS—SHEET 1.

Witnesses
Walter B. Payne.
H. H. Simms

Inventor
Edward Bausch
By Church & Rich
his Attorneys

No. 873,008. PATENTED DEC. 10, 1907.
E. BAUSCH.
ENGRAVING MACHINE.
APPLICATION FILED JUNE 13, 1907.
2 SHEETS—SHEET 2.
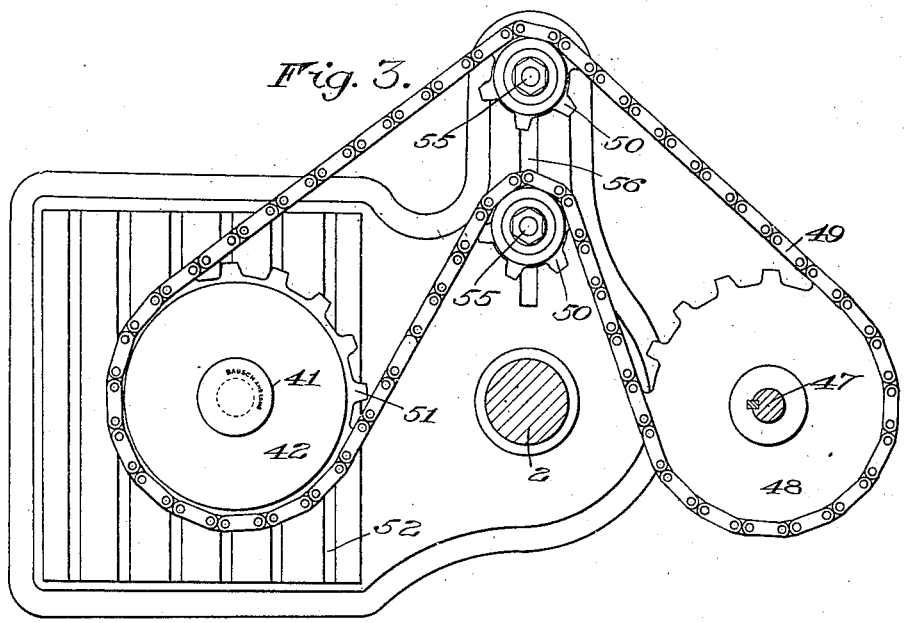
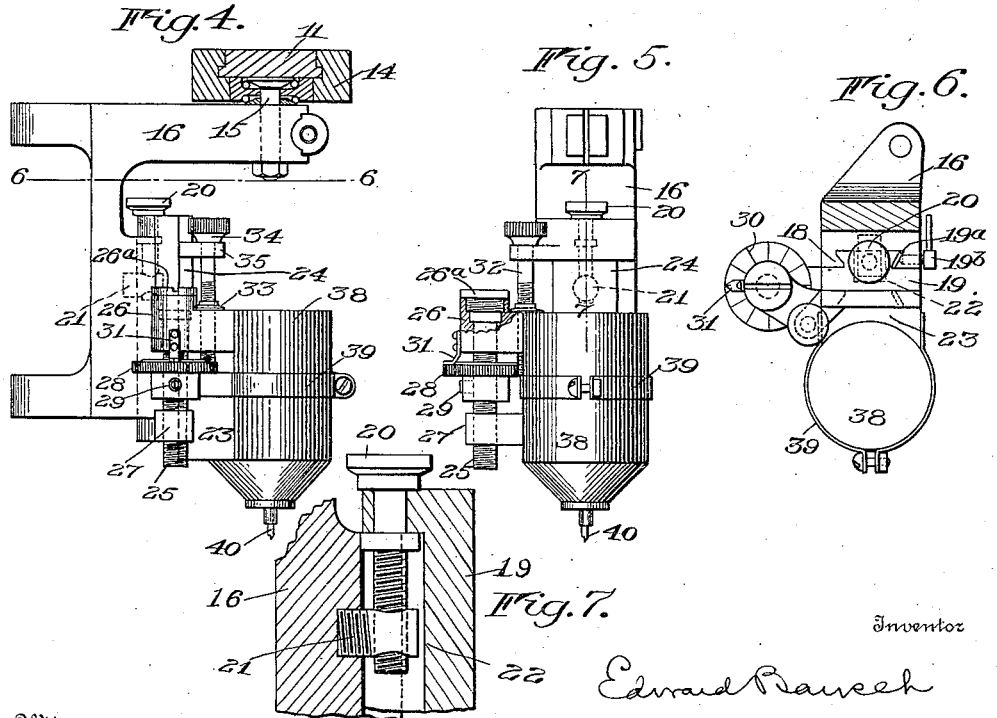
Witnesses
Walter B. Payne.
H. H. Simms
Inventor
Edward Bausch
By Church & Rich
his Attorneys

UNITED STATES PATENT OFFICE.

EDWARD BAUSCH, OF ROCHESTER, NEW YORK, ASSIGNOR TO BAUSCH & LOMB OPTICAL COMPANY, OF ROCHESTER, NEW YORK, A CORPORATION OF NEW YORK.

ENGRAVING-MACHINE.

No. 873,008.  Specification of Letters Patent.  Patented Dec. 10, 1907.

Application filed June 13, 1907. Serial No. 378,685.

*To all whom it may concern:*

Be it known that I, EDWARD BAUSCH, of Rochester, in the county of Monroe and State of New York, have invented certain new and useful Improvements in Engraving-Machines; and I do hereby declare the following to be a full, clear, and exact description of the same, reference being had to the accompanying drawings, forming a part of the specification, and to the reference numerals marked thereto.

This invention relates to an engraving machine of the type in which a tracer controls the movement of the cutting or engraving tool through the medium of a pantograph; the present invention being designed to obviate the excessive vibrations of the cutting or engraving tool, by providing a machine in which the motor is moved with the pantograph, thus bringing the motor close to the tool and dispensing with parts which would produce vibrations in the tool; and to overcome inability of the machine to engrave upon two widely separated points on a work piece without adjusting the work or increasing the size of the pantograph to such an extent that the machine was rendered cumbersome, by employing a movable pattern support connected to a movable work support in such a manner that when the pattern is thrown into the field of the tracer, the work will take a corresponding position relative to the cutting tool.

A further feature is the provision of a coarse adjusting mechanism to effect the shifting of the motor, the tool and the fine adjusting mechanism, the latter serving to determine the position of an adjustable stop to limit the depth of cutting of the tool.

To these and other ends the invention consists in certain improvements and combinations of parts all as will be hereinafter more fully described, the novel features being pointed out in the claims at the end of the specification.

Figure 2:
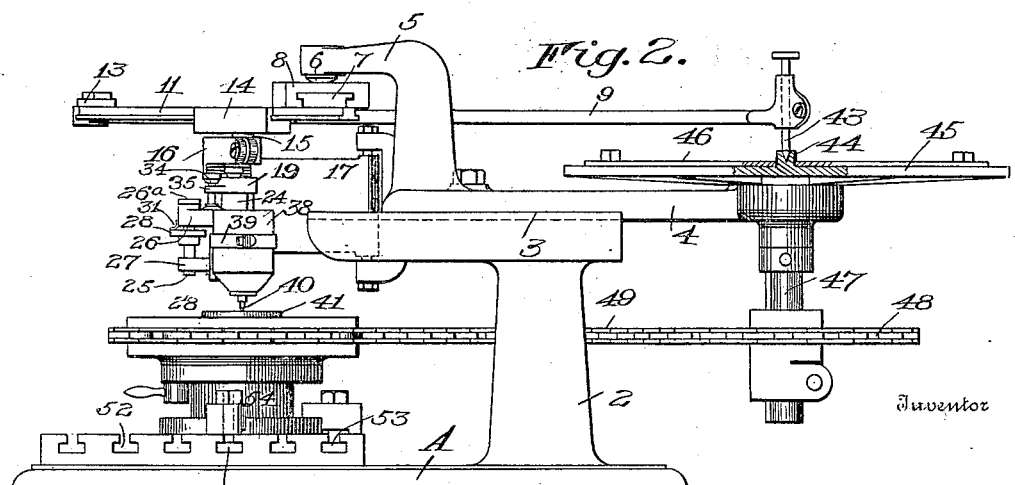

In the drawings: Figure 1 is a top view of an engraving machine embodying my invention. Fig. 2 is a front elevation. Fig. 3 is a horizontal section in the plane of the top surface of the work support. Fig. 4 is a view showing the motor, its support and its adjusting mechanisms in side elevation. Fig. 5 is a view showing the same parts in front elevation. Fig. 6 is a top view of the adjusting mechanism. Fig. 7 is a vertical section on line 7—7 Fig. 5.

With extended reference to the embodiment shown in the drawings A indicates a base or plate having a standard 2 with a horizontal guide 3 at its upper end for a carrier 4, which is formed with an overhanging arm 5 having a suitable pantograph pivoted thereon at 6. The pantograph which may be of any suitable construction, in this instance comprises a lever 7 slidably or adjustably connected to a guide block 8 pivotally hung from the arm 5, and having a tracer lever 9 pivoted to one end thereof at 10 and a tool carrying lever 11 pivoted at 12 to the other end, the levers 9 and 11 in turn being pivotally connected by a link 13 so as to maintain the parallel relation between them.

Upon the lever 11 is slidably arranged a block 14 to which is pivotally connected at 15 the tool carrier frame 16 having connection with the main carrier 4 by a link 17, the latter serving to hold the frame 16 against rotation, due to the driving of the tool. Tool carrier frame 16 has a vertical guide 18 on which moves the coarse adjustment slide 19 preferably roughly adjusted on the carrier frame 16 by means of a vertically arranged bolt 20 journaled in slide 19 and engaging a nut 21 which is held against rotation on the carrier frame 16 and projects from the latter into a groove 22 in the adjacent face of slide 19. The coarse adjustment slide 19 which is locked against movement by a friction plate 19$^a$ moved by a cam screw 19$^b$, supports a motor carrier 23 mounted on a vertical guide 24 on the slide 19, and a fine adjustment mechanism preferably comprising a vertically arranged screw 25 journaled in an arm 26 extending from the motor-carrier and engaging a nut 27 extending laterally from the slide 19. The screw 25 is held against axial movement on the arm 26 by a screw plug 26$^a$ and is rotated by a thumb piece 28 rigidly secured to the former as by a set screw 29 and having its upper surface provided with a scale 30, each division of which may indicate an adjustment of one thousandth of an inch and with which coöperates an index 31 depending from arm 26. Also supported by the motor carrier 23 is an adjustable stop preferably in the form of a vertically arranged screw 32 having screw threaded engagement at 33 with carrier 23 and a shoulder 34 which coöperates with a fixed stop 35 on the coarse adjustment slide 19, the relative positions of the stops being determined by the fine adjustment mechanism as will be hereinafter described. A motor 38 is secured to the carrier 23 by spring straps 39 and has a cutting or engraving tool 40 arranged directly on its driving shaft to operate on a suitable work piece 41 secured in any suitable manner to the work piece support 42.

The position of the tool 40 is controlled by a tracer 43 arranged on the outer end of lever 9, resting in inoperative position, in a socketed boss 44 in the center of a pattern support 45 and movable over the pattern 46 to any point within the field indicated by the dot and dash lines in Fig. 1. In engraving machines of ordinary construction when the pattern extends beyond this field, it is necessary to adjust the pattern and the work piece separately, but in this invention this adjustment is simultaneously accomplished by mounting the pattern support 45 and the work support 42 so that they may rotate and by connecting them together so that when the pattern is moved, the work support will be moved therewith to a corresponding position relative to the cutting tool. To this end the pattern support 45 is preferably provided with a depending spindle 47 extending through the carrier 4 and having a sprocket wheel 48 around which passes an endless sprocket chain 49 which, after passing around two idlers 50, connects with a sprocket wheel 51 on the work support 42. The work support 42 may be arranged in various positions on the base plate A, which for this purpose preferably has a plurality of inverted T grooves 52 in which projections 53 on the standard 54 of the work support are adapted to extend to hold the latter against movement; and, so that the chain 49 may permit the work support to make this movement, the bearings 55 of idlers 50 are adjustably arranged in a guideway 56 on the base plate.

Briefly stated the operation is as follows: The tool, 40 through the coarse adjustment mechanism is moved until the end thereof touches a work piece previously secured on the work support 42 and then the work piece and tool are shifted horizontally relatively to each other so that the fine adjustment mechanism may be brought into operation to lower the end of the tool a distance below the upper surface of the work piece corresponding to the depth to be cut, the scale 30 being employed to determine the distance. When the tool has been adjusted to this position, the adjustable stop is caused to engage the fixed stop 35 and after the relative positions of the stops have been determined, the fine adjustment mechanism is employed to elevate the tool and the work piece and the tool are again shifted horizontally so that the latter may operate on the work piece. To engrave, the tool is fed to the work piece by the fine adjustment until the stops again engage. The position of the cutting or engaging tool on the work piece is controlled by the tracer 43 through the medium of the pantograph and, should the pattern extend beyond the field of the tracer, the pattern support is moved until the pattern is within reach, thereby causing a corresponding relative movement of the work piece to the tool.

The invention claimed improves the quality of the work by giving greater accuracy and by reducing the vibrations of the cutting tool, and at the same time decreases the cost of engraving by dispensing with a number of adjustments, thus making the employment of skilled labor unnecessary.

I claim as my invention:

1. In an engraving machine, the combination with a tracer, and a pantograph controlled thereby, of a carrier frame pivoted to the pantograph, a motor movable on the carrier frame and having a cutting tool secured to its shaft, and coarse and fine adjustments for feeding the motor with the tool on the carrier.

2. In an engraving machine, a tracer, a tool controlled thereby, a coarse adjustment for the tool, and a fine adjustment moved by the coarse adjustment and controlling the feeding of the tool.

3. In an engraving machine, a tracer, a tool controlled thereby, a coarse adjustment for the tool, a fine adjustment moved by the coarse adjustment and controlling the feeding of the tool, and an adjustable stop arranged to limit the feeding of the tool by the fine adjustment and to have its position determined by the latter.

4. In an engraving machine, a tracer, a carrier frame controlled thereby, a coarse adjustment slide guided on the carrier frame, a carrier guided on the slide and having a cutting tool arranged thereon, fine adjustment mechanism connecting the slide and the carrier, and coöperating stops on the carrier and the slide, one of which is adjustable and has its position determined by the fine adjustment.

5. In an engraving machine, a tracer, a carrier frame connected thereto, a coarse adjustment slide guided on the frame, a motor carrier guided on the slide, fine adjustment mechanism connecting the slide and the motor carrier, and a motor on the motor carrier having a cutting tool connected thereto and moved therewith.

6. In an engraving machine, a tracer, a motor and a tool moved with the tracer, fine adjusting mechanism for moving the motor and the tool, and coarse adjusting mechanism for moving the fine adjusting mechanism and the motor and its tool.

7. In an engraving machine, a tracer, a carrier frame controlled by the tracer, a slide guided on the carrier frame, a vertically arranged screw for adjusting the slide, a motor and tool carrier guided on the frame, and fine adjustment mechanism connecting the motor and tool carrier frame and the slide.

8. In an engraving machine, a tracer, a carrier frame controlled by the tracer, a coarse adjustment slide guided on the said frame, a tool carrier guided on the slide, and an adjustable stop for limiting the feeding of the tool carrier.

9. In an engraving machine, a tracer, a carrier frame controlled by the tracer, a coarse adjustment slide guided on the said frame, a tool carrier guided on the slide, a fine adjustment screw connecting the slide and the tool carrier, and coöperating stops on the slide and carrier, one of which is adjustable and has its position determined by the fine adjustment screw.

10. In an engraving machine, a movable work support, a movable pattern support, a cutting tool movable over the work support, a tracer movable over the pattern support, and controlling the cutting tool, and connection between the work support and the pattern support permitting the pattern to be moved into the field of the tracer and the work support to be moved correspondingly with relation to the tool.

11. In an engraving machine, a rotatable pattern support, a tracer movable thereover, a rotatable work support, a cutting tool movable thereover and controlled by the tracer, and connection between said work and pattern supports effecting simultaneous rotation of said supports.

12. In an engraving machine, a movable work support, a cutting tool movable over the work support in a plane parallel to the plane of movement of the latter, a movable pattern support, a tracer movable over the pattern support in a plane parallel to the plane of movement of the pattern support and controlling the movement of the cutting tool, and connection between the pattern and the work support effecting their simultaneous movements, whereby the cutting tool may be made to operate at any one point on the work at any position within the range of movement of the tool.

13. In an engraving machine, a cutting tool, a tracer controlling the position of the tool, a rotatable work support for the tool, a rotatable pattern support for the tracer, a shiftable standard on which the work support is mounted, and a connection between the rotatable work support and the rotatable pattern support causing the rotation of one when the other is rotated, and embodying a chain and shiftable idlers about which the chain passes.

EDWARD BAUSCH.

Witnesses:
Wm. G. Woodworth,
H. C. Thon.